Dec. 17, 1968   J. J. TIEMANN   3,417,328
IN-CIRCUIT INDUCTANCE MEASURING CIRCUIT
Filed March 21, 1966

Inventor:
Jerome J. Tiemann,
by Marvin Snyder
His Attorney.

United States Patent Office 3,417,328
Patented Dec. 17, 1968

3,417,328
IN-CIRCUIT INDUCTANCE MEASURING CIRCUIT
Jerome J. Tiemann, Burnt Hills, N.Y., assignor to General
Electric Company, a corporation of New York
Filed Mar. 21, 1966, Ser. No. 536,002
7 Claims. (Cl. 324—59)

ABSTRACT OF THE DISCLOSURE

Apparatus for measuring inductance of a circuit component without removing the component from the circuit in which it is connected. The measuring apparatus comprises a tunnel diode and series resistive load for connection across the circuit component so as to form a relaxation oscillator, together with a frequency meter in shunt with the tunnel diode. Oscillation frequency, as displayed on the meter, is thus dependent on the inductance of the component being measured, and is essentially independent of any capacitance or resistance in shunt with the component.

---

Figure 1:
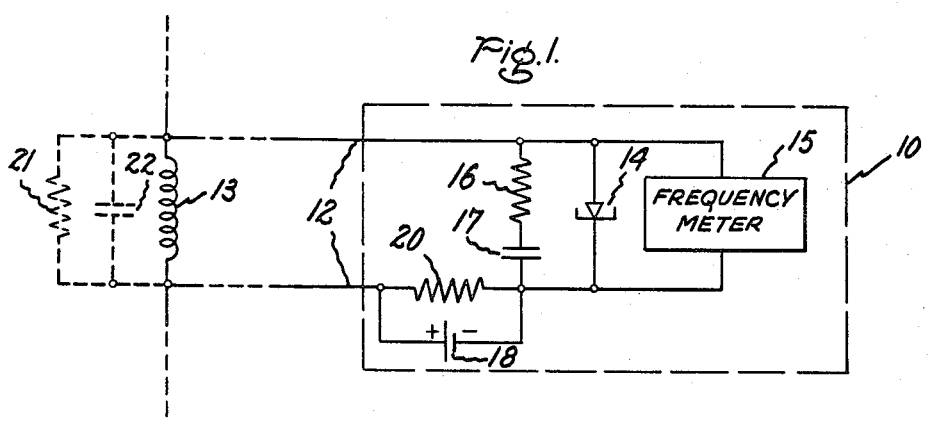

This invention relates to inductance metering circuits, and more particularly to circuits for measuring inductance of components connected in a circuit without requiring removal of the component therefrom.

An inductance measurement of a circuit component usually requires removal of the component from the circuit in order to avoid erroneous readings due to circuitry connected in shunt with the component. However, removal of the component from the circuit involves a time consuming operation, and a second time-consuming operation is involved when the component is reinserted into the circuit. This is especially true where components are fabricated by thin film techniques, and may be impossible if an entire circuit is fabricated in a single process.

By use of the negative resistance diode circuit described herein, it is possible to measure inductance of a circuit component to a high degree of accuracy, without ever removing the component from the circuit in which it is connected. This is because the measuring circuit is relatively insensitive to any capacitance or resistance which may be connected in shunt with the inductive component. The circuit oscillates at a frequency determined substantially by the size of the inductance to be measured; hence, readout is readily achieved by use of a frequency meter which may conveniently be calibrated in units of inductance.

Another instance where in-circuit inductance measurements are useful is with transducer means wherein a condition-responsive inductance is measured to provide an indication of a measured physical quantity. Such transducer means may include shunt capacitance, resistance, or both, in which the capacitance or resistance changes in a manner not directly related to the change in the physical quantity to be measured. Moreover, in a transducer for measuring a particular physical quantity of one type, but which may also be responsive to another physical quantity, as in the case of a force transducer operation in a variable temperature environment, the inductance of the transducer may represent a measure of the physical quantity (force) to be measured, while the resistance of the transducer may represent a measure of the incidental physical quantity (temperature) which is to be ignored by the transducer. In these instances it may be virtually impossible to isolatedly measure the transducer inductance. The advantages which accrue from capability of measuring inductance independent of shunt capacitance, resistance or both, are thus plainly evident.

Accordingly, one object of the invention is to provide means for measuring inductance of a circuit component without requiring electrical isolation of the component from its associated circuitry.

Another object is to provide an inductance measuring circuit which is substantially insensitive to capacitance or resistance connected in shunt with the inductance.

Another object is to provide an inductance measuring circuit wherein an output signal frequency bears a known relationship to the amount of the inductance being measured.

Briefly, in accordance with a preferred embodiment of the invention, an inductance measuring circuit is provided comprising a negative resistance diode, circuit means for suppressing spurious oscillations connected in shunt with the negative resistance diode, frequency measuring means connected in shunt with the negative resistance diode, and a pair of input terminals adapted to be connected across an unknown inductance to be measured within an external circuit. A source of D.C. bias shunted by a resistance is coupled to one of the terminals and the negative resistance diode is coupled to the other of the terminals. The frequency measuring means thus measures the oscillation frequency of the A.C. voltage appearing across the negative resistance diode. This frequency, which is substantially independent of any capacitance and resistance in shunt with the unknown inductance, is thus a measure of the inductance.

Figure 2:
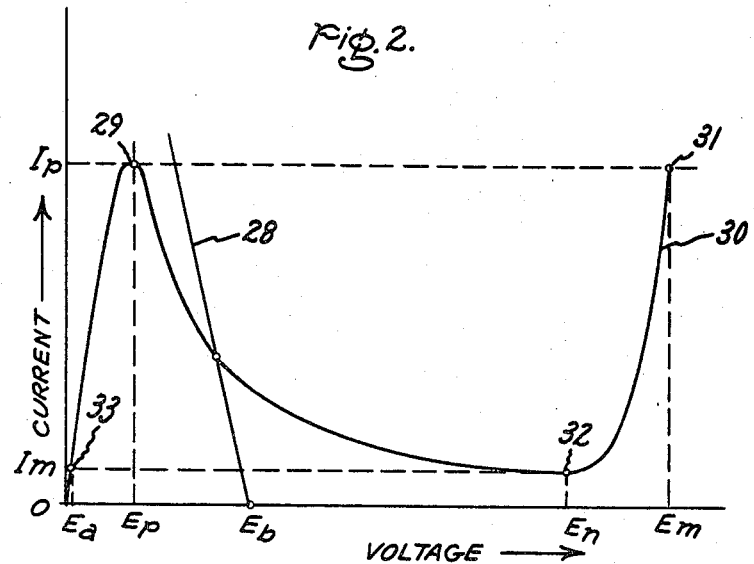

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

FIGURE 1 is a schematic diagram of the preferred embodiment of the in-circuit inductance measuring circuit of the present invention; and FIGURE 2 is a current-voltage characteristic of a typical negative resistance diode utilized in the invention, to aid in describing operation of the circuit of FIGURE 1.

In FIGURE 1, inductance measuring circuit 10 having a pair of input leads 12 is shown connected to a component 13 which has a continuous path for permitting flow of D.C. current and whose inductance is to be measured. Component 13, shown as an inductor, is connected in a circuit external to measuring circuit 10. Also connected in the external circuit may be a resistance 21 and a capacitance 22, both of which, shown dotted, are in shunt with component 13.

Measuring circuit 10 comprises a negative resistance diode 14, such as a tunnel diode, connected in shunt with a high input impedance frequency meter 15 which may conveniently be calibrated in units of inductance. This frequency meter can be a tuneable L-C filter in combination with an R.F. voltmeter. In addition, a series RC circuit comprising a resistance 16 and a capacitance 17 is connected in shunt with diode 14 for the purpose of attenuating spurious high frequency oscillations. Diode 14 is forward biased from a D.C. power supply 18 whenever a component to be tested is connected to measuring circuit input leads 12. A resistance 20 is connected in shunt with power supply 18, and serves as a load on negative resistance diode 14.

As long as no circuit component to be measured is connected across input leads 12, the measuring circuit is inoperative since no voltage is applied across negative resistance diode 14. However, when leads 12 are connected across an inductive component, frequency meter 10 provides an indication of the amount of inductance measured in the component. The oscillation voltage applied to the frequency meter is maintained continuously, until leads 12 are removed from the component being tested.

FIGURE 2 furnishes graphical illustration of operation of the circuit of FIGURE 1. Thus, when leads 12 are connected across inductance 13, current tends to increase from zero along diode characteristic 30 to a maxivalue $I_p$ at a point 29. Assuming that the voltage $E_b$ of power supply 18 is greater than the voltage $E_p$ at which the diode characteristic reaches its initial current peak 29, the operating point of the diode abruptly switches to a point 31 on the diode characteristic wherein diode current remains at value $I_p$, but the voltage across the diode reaches a new value $E_m$ which exceeds voltage $E_b$. This switching is due to instability of the circuit when the diode is biased in the negative resistance region of the diode characteristic.

When the diode operates at point 31 on the diode characteristic, the diode voltage $E_m$ exceeds the battery voltage, and hence diode current begins to decrease along the diode characteristic. When the diode operating parameters reach point 32, representing a minimum amount of current $I_m$ through the diode, diode voltage $E_n$ remains in excess of battery voltage $E_b$. Hence, a further decrease in voltage across diode 14 occurs abruptly, as the diode switches to a new operating point 33 on the positive resistance region of the diode characteristic. At this point, the voltage $E_a$ across diode 14 is below power supply voltage $E_b$, so that diode voltage again begins to increase. The operating point of diode 14 thereby again moves along characteristic 30 toward point 29.

The foregoing analysis of the operating point of diode 14 is predicated upon D.C. load line 28, determined by resistance 20 and power supply 18 of FIGURE 1, intersecting diode characteristic 30 in the negative resistance region, as illustrated. By virtue of this intersection, there may be no stable operating point; hence, the circuit can operate as an oscillator.

Frequency of operation of the circuit illustrated in FIGURE 1 can be shown to be dependent upon the time $T_1$ required for the circuit to move from operating point 33 to operating point 29 and time $T_2$ for the circuit to move from operating point 31 to operating point 32. These time periods are determined by the formulae $$T_1 \sim \frac{L(I_p - I_m)}{E_b}$$

and $$T_2 \sim \frac{L(I_p - I_m)}{E_m - E_b}$$

In comparison to these time periods, the time required for the circuit to switch from operating point 29 to operating point 31 and from operating point 32 to operating point 33 is negligible. Hence, variation in the size of inductance 13 changes times $T_1$ and $T_2$, which changes the frequency of oscillation. The new frequency may be read upon frequency meter 15, and the size of inductance 13 may be deduced therefrom. Alternatively, the scale of frequency meter 15 may be calibrated in units of inductance, so as to provide direct readings of the size of inductance 13.

The reason for the circuit being quite insensitive to resistance or capacitance is due to the fact that the time required for each cycle of oscillation is consumed almost entirely by the time required for the diode current to change from $I_m$ to $I_p$ between points 33 and 29, and from $I_p$ to $I_m$ between points 31 and 32. During these intervals, voltage across the diode changes only very slightly (from $E_a$ to $E_p$ and $E_m$ to $E_n$, respectively); therefore, voltage across component 13 is also substantially constant during these times. If component 13 is shunted by a resistance, such as resistance 21, the net effect is small because the average tunnel diode current is the same in both the high voltage state and the low voltage state. In both cases this average current $I \sim \frac{1}{2}(I_p + I_m)$. This means that the voltage drop in the resistance is the same in both states, and the net effect on the frequency of oscillation of circuit 10 is small. On the other hand, if component 13 is shunted by a capacitance, such as capacitance 22, the voltage on the capacitance quickly reaches a substantially constant D.C. level early in the interval and remains at this level throughout the interval, due to the substantially constant D.C. voltage level applied thereacross. Thus, there is practically no charging current flowing in the capacitor during the periods $T_1$ and $T_2$.

During the switching intervals, occurring when the tunnel diode voltage changes from $E_p$ to $E_m$ between operating points 29 and 31, and from $E_n$ to $E_a$ between operating points 32 and 33, voltage changes occur substantially instantaneously. Although these changes are actually somewhat affected by shunt capacitance 22, there is no appreciable effect on frequency of oscillation because the switching times of each cycle are so short in relation to the remainder of the cycle. Hence, the circuit frequency of oscillation as measured by the frequency meter is basically dependent upon only those changes which occur when the circuit moves from operating point 33 to operating point 29 and from operating point 31 to operating point 32, irrespective of capacitance and resistance in shunt with the inductance being measured.

Although resistance 16 and capacitance 17 produce the beneficial effect of eliminating high frequency oscillations which may produce erroneous readings, it is necessary to impose limits on the sizes of these components so as to avoid attenuation of desired oscillating frequencies. These sizes may be specified in the following manner.

Assume $\Delta E = (E_p - E_n) = (E_m - E_n)$. In addition let $L =$ inductance of component 13,
$i =$ current through component 13, and
$t =$ time.

Hence, $$\Delta E = L \frac{di}{dt}$$

and $$di/dt = \Delta E / L$$

Since $\Delta E / L$ is approximately a constant, $$i = \frac{\Delta E}{L} t$$

Assuming T = period of oscillation, $$I_p = \frac{\Delta E}{L} \frac{T}{2}$$

Since frequency of oscillation $f$ is the inverse of the period, $$f = \Delta E / 2LI_p$$

To avoid attenuating desired oscillations, $$1/RC \gg 2\pi f$$

Thus $$1/RC \gg \pi \Delta E / LI_p$$

or $$RC \ll LI_p / \pi \Delta E$$

for the smallest value of inductance to be measured. This imposes a limitation on the maximum size of the product of resistance 16 and capacitance 17.

The foregoing describes a circuit for measuring inductance of a circuit component without requiring electrical isolation of the component from its associated circuitry. The circuit is substantially insensitive to capacitance or resistance connected in shunt with the inductance being measured, and the output signal frequency bears a known fixed relationship to the amount of inductance being measured.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What is claimed is:

1. An inductance measuring circuit comprising: a negative resistance diode; circuit means for suppressing spurious oscillations connected in shunt with said negative resistance diode; D.C. bias means; resistance means connected in shunt with said D.C. bias means; a pair of input terminals adapted to be connected across an unknown inductance to be measured within an external circuit, said D.C. bias means being coupled in series circuit with said negative resistance diode, said series circuit being coupled across said terminals; and frequency measuring means connected across said negative resistance diode for measuring frequency of an A.C. signal resulting across said negative resistance diode, whereby said signal frequency is a measure of said unknown inductance and is substantially independent of any capacitance and resistance in shunt with said inductance.

2. The inductance measuring circuit of claim 1 wherein said negative resistance diode comprises a tunnel diode.

3. The inductance measuring circuit of claim 2 wherein said D.C. bias means is connected to furnish forward bias to said tunnel diode through said unknown inductance.

4. The inductance measuring circuit of claim 1 wherein said circuit means includes a resistance connected in series with a capacitance.

5. The inductance measuring circuit of claim 4 wherein the product of the resistive and capacitive values of said resistance and capacitance respectively is selected to be less than the reciprocal of the product of $\pi$ and twice the maximum frequency to be measured.

6. The inductance measuring circuit of claim 5 wherein said negative resistance diode comprises a tunnel diode.

7. The inductance measuring circuit of claim 6 wherein said D.C. bias means is connected to furnish forward bias to said tunnel diode through said unknown inductance.

References Cited

UNITED STATES PATENTS 3,237,123   2/1966   Watters _____ 331—107

OTHER REFERENCES

Crutchfield et al., "Display Tunnel Diode Curves," Electronic Industries, October 1960, pp. 74–75.

Gottlieb et al., "Tunnel Diodes," Electronics, June 14, 1963, pp. 36–42.

Turner, "Tunnel Diode Dip-Meter," Radio-Electronics, April 1961, pp. 42–43.

RUDOLPH V. ROLINEC, *Primary Examiner.*

EDWARD E. KUBASIEWICZ, *Assistant Examiner.*

U.S. Cl. X.R.

331—107